United States Patent Office 2,898,444
Patented Aug. 4, 1959

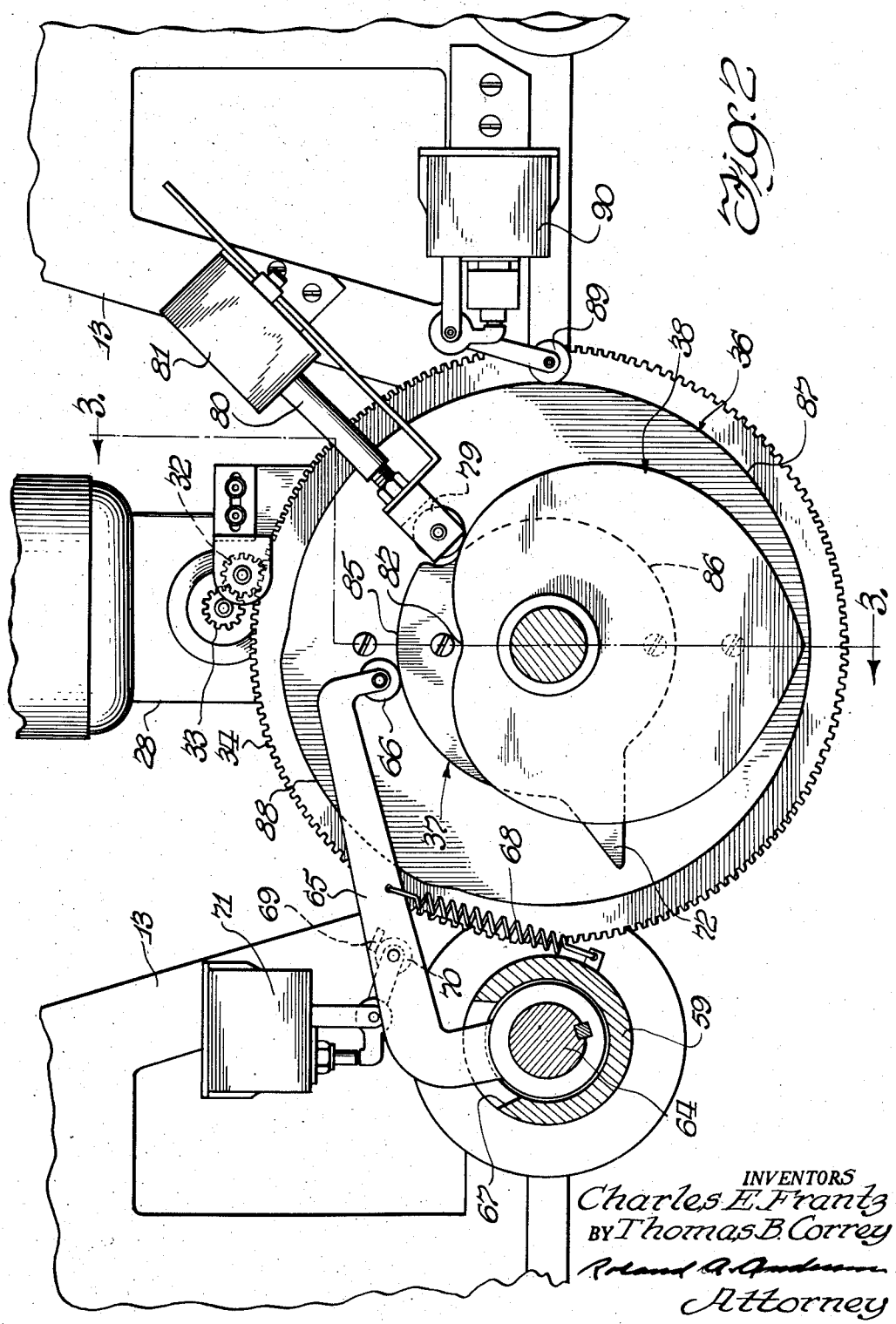

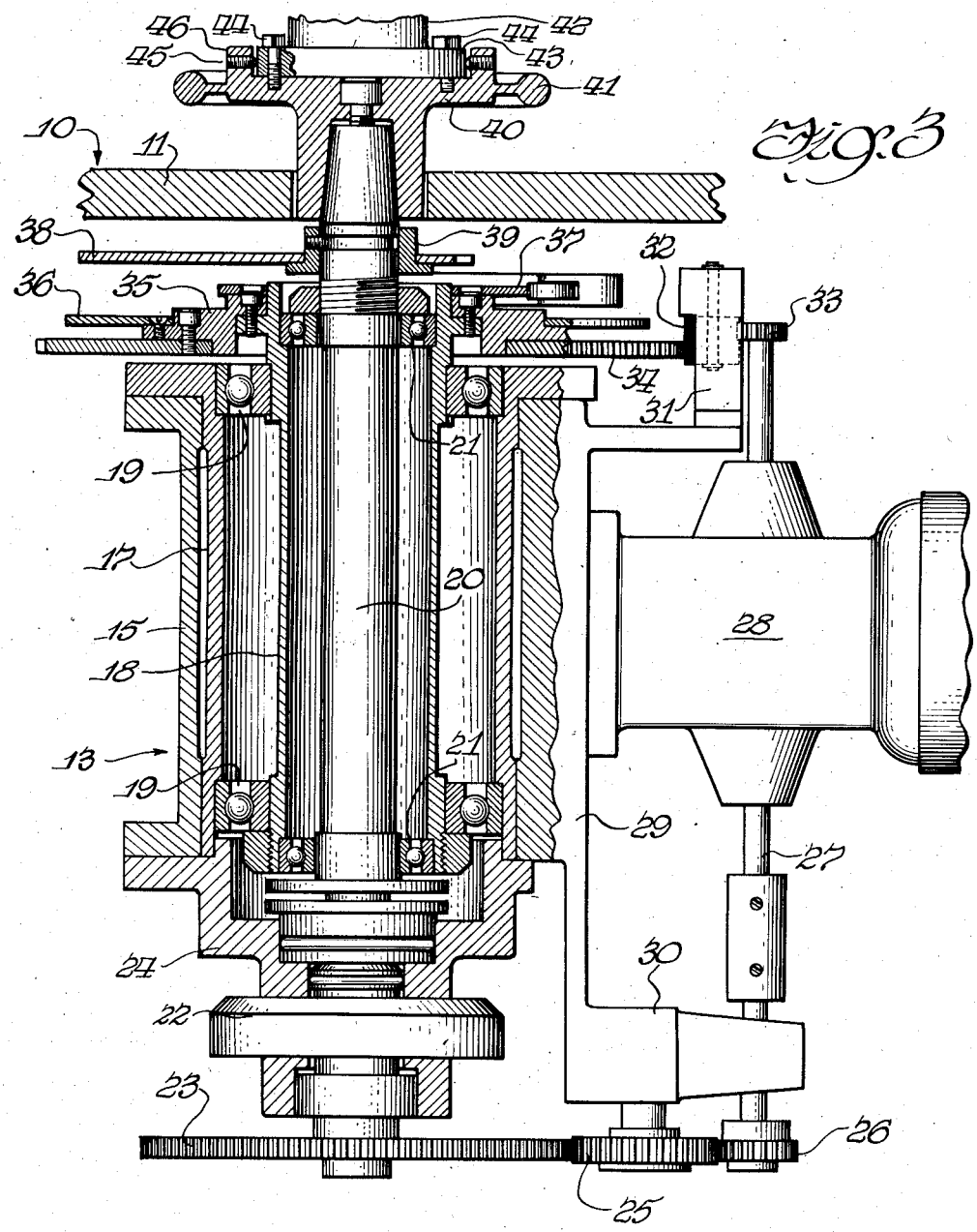

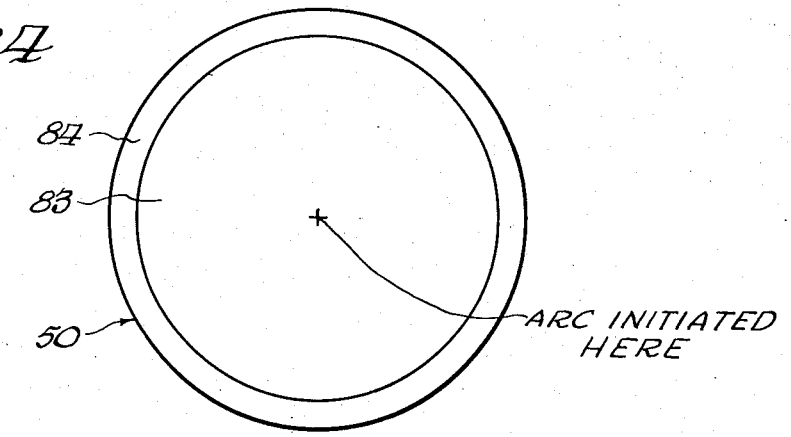
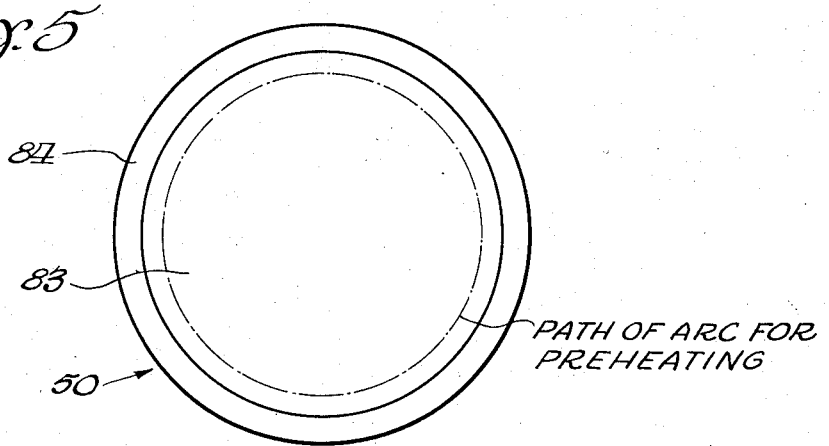
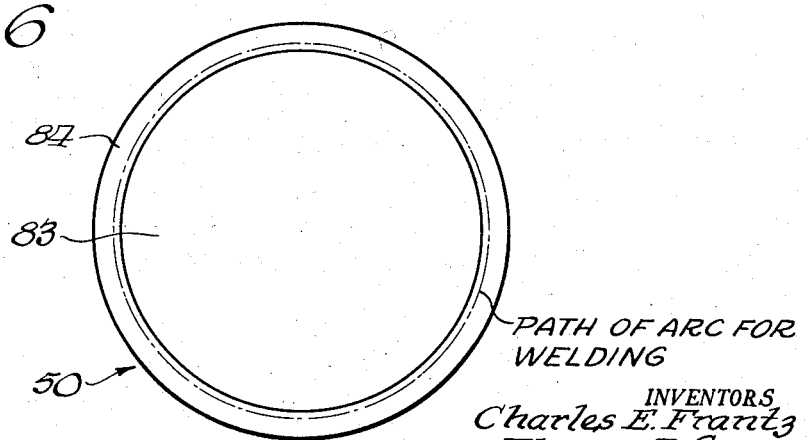

2,898,444

APPARATUS AND METHOD FOR WELDING END CLOSURE TO CONTAINER

Charles E. Frantz and Thomas B. Correy, Richland, Wash., assignors to the United States of America as represented by the United States Atomic Energy Commission Application January 30, 1956, Serial No. 562,355

3 Claims. (Cl. 219—124)

The present invention relates to a novel apparatus for welding. More specifically, it relates to preheating and welding of an end closure to the open end of a can or container.

Uranium slugs to be used in a neutronic reactor are normally encased in a protective can or container of a suitable material such as aluminum. A convenient way of encasing the uranium slug in aluminum is to bond the uranium can by means of an aluminum-silicon bath to the interior of an aluminum can having one end open and welding an aluminum end closure to the open end of the can.

The present apparatus is to carry out the welding of the end closure to the can. According to the present invention, an arc is struck between a welding electrode and an end closure assembled with a fuel slug and a can; preheating is carried out by rotating the end closure, can, and fuel slug and directing the arc against a region of the end closure between the center and the outer edge thereof; and welding takes place between the end closure and the can by virtue of rotating the end closure, can, and fuel slug and directing the arc against the outer edge of the end closure.

In the drawings:

Fig. 2 is a horizontal sectional view taken on the line 2—2 of Fig. 1;

Fig. 3 is a vertical sectional view taken on the line 3—3 of Fig. 2;

Fig. 4 is an end view of an assembly to be welded, illustrating the initiation of the welding arc;

Fig. 5 is an end view of the assembly, showing the pre-heating path of the welding arc; and Fig. 6 is an end view of the assembly, showing the welding path of the welding arc.

Figure 1:
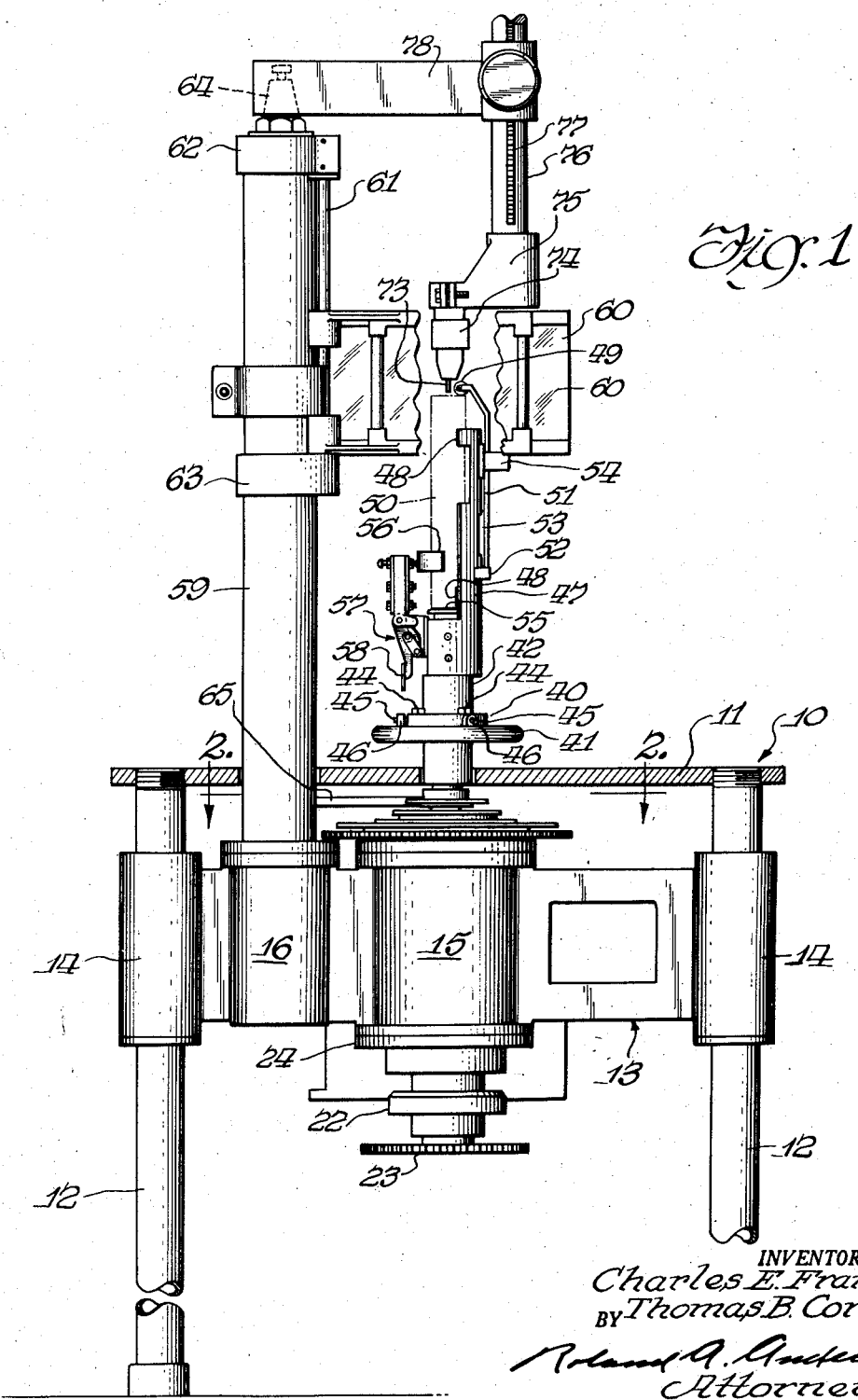
Fig. 1 is an elevational view, partly, in section of the novel welding apparatus of the present invention.

The apparatus of the present invention includes a table 10 which comprises a top plate 11 and four legs 12 having their upper ends secured to the corners of the top plate. Positioned beneath the top plate 11 in spaced relation thereto is a heavy framework 13 which has four hollow outer portions 14 which receive the table legs 12 and are pinned thereto for support. The framework 13 has a relatively large central tubular portion 15 and a relatively small tubular portion 16 disposed to one side of the central tubular portion 15.

The tubular portion 15 carries a sleeve 17, in which is journaled a hollow outer shaft 18 by means of ball bearings 19. An inner shaft 20 is journaled within the outer shaft 18 by means of ball bearings 21 and is connected at its lower end through a clutch 22 with a gear 23. The clutch 22 and gear 23 are supported by a casting 24 which is secured to the lower end of the central tubular portion 15 of the framework 13. The gear 23 meshes with an idler gear 25 which meshes with a pinion 26 secured to one end of a drive shaft 27 of a motor 28. The motor 28 is secured to a bracket 29 which is mounted on the framework 13 by being secured to the tubular portion 15.

The bracket 29 has a lower extension 30 which supports the end of the motor shaft 27 to which the pinion is connected and also carries the idler gear 25. The bracket 29 also has an upper extension 31 which supports an idler gear 32 which meshes with a pinion 33 on the upper end of the motor shaft 27 and with a gear 34. The gear 34 is secured to the upper end of the outer shaft 18 by means of a collar 35. The collar 35 also secures a crater-fill cam 36 and an electrode arm cam 37 to the upper end of the outer shaft 18. A reference or positioning cam 38 of cardioid shape is secured to the inner shaft 20 near its upper end by means of a collar 39. The cams 36, 37, and 38 are positioned between the top plate 11 of the table and the framework 13.

Above the top plate 11 a head 40 is secured to the upper end of the inner shaft 20. The head 40 has a handle portion 41 for manual positioning. The head 40 supports a post 42 which has an enlarged base flange 43 having slots receiving screws 44 which are threaded into the head 40 so as to secure the post 42 thereto. Screws 45 threaded through lugs 46 on the head 40 adjust the post transversed, to align the post 42 with the inner shaft 20. The upper end of the post 42 carries a shell 47 secured thereto which is provided with upper and lower contacts 48 of silver.

A gage roller 49, engageable with the upper end of an assembly 50 to be welded composed of fuel slug, can, and end closure, is carried on the upper end of a strip 51, which has its lower end pivotally connected to a bracket 52 secured to the shell 47. The roller 49 and the strip 51 are urged outwardly from the shell 47 by a spring 53 to the extent permitted by a strap 54 secured to the shell 47 and extending around an intermediate portion of the strap 54. The post 42 carries at its upper end a spring-urged base member 55 which is engageable with the bottom of the assembly 50, that is, the closed end of the can. A clamp 56, which has a facing of insulating material engageable with the side of the assembly 50, is mounted at the upper end of the post 42 by means of a toggle linkage 57, which permits the clamp to be moved up to the assembly 50 and held thereagainst. The toggle linkage 57 is manually controlled by pulling or pushing a depending pad 58 forming an extension of one of the elements of the toggle linkage 57.

As shown in Fig. 1, a tubular housing 59 has its lower end positioned in, and non-rotatably secured to, the tubular portion 16 of the framework 13 and projects upwardly therefrom through an opening in the top plate 11 of the table 10. A welding shield 60 is pivotally supported on a rod 61 which parallels the tubular housing 59 and has its ends mounted in rings 62 and 63 secured to the upper end and an intermediate portion of the tubular housing 59.

A shaft 64, which is shown in Figs. 1 and 2, is journaled in the tubular housing 59 and held against longitudinal movement with respect thereto by means including bearings, not shown, located near the upper and lower ends of the housing 59 and the shaft 64. As shown in Fig. 2, an arm 65 has its inner end secured to the shaft 64 a little below the top plate 11 of the table and carries at its outer end a roller follower 66 engaging the cam 37. The arm 65 extends through an opening 67 in the tubular housing 59. A spring 68, connected at one end to the arm 65 and at the other end to the housing 59, holds the follower 66 in engagement with the cam 37 at all times. A depending projection 69 on the arm 65 is engageable with a roller 70 of a micro-switch 71 carried by the framework 13, so that, when the arm 65 moves counterclockwise and then clockwise from the position shown in Fig. 2 because of riding of the follower 66 over a pointed portion 72 of the cam 37, the projection 69 moves away from the roller 70, permitting the switch 71 to close, thereby initiating an arc between the assembly 50 and an electrode 73 (Fig. 1).

The electrode 73 is carried by a head 74 which is in turn carried by a member 75 having an integral stem 76 on which are formed rack teeth 77. The electrode 73 is adjustable toward and away from the assembly 50 to be welded by vertical movement of the stem 76 through the outer end of an arm 78. Such movement of the stem 76 is prevented by fixing against rotation a gear, not shown, carried in the outer end of the arm 78 by means of a pin or set screw, also not shown. The inner end of the arm 78 is secured to the upper end of the shaft 64 so as to move with the shaft about its own axis.

As shown in Fig. 2, the reference cam 38 is engaged by a roller follower 79 mounted on one end of a rod 80 the other end of which is connected to a piston, not shown, positioned in a pneumatic cylinder 81, mounted on the framework 13. The arrangement is such that when pneumatic pressure is applied to the piston in the cylinder 81, the roller follower 79 is urged against the cam 38. When the follower 79 engages the cam 38 at a place other than a depression 82 formed thereon at a region of minimum radius, pressure of the follower 79 will cause the cam 38 to rotate until the depression 82 engages the follower 79, the workpiece-holding fixture 47 thus being located in the load-unload position. The follower 79 is retracted completely from the cam 38 by reversal of the pneumatic pressure applied to the piston in cylinder 81. Now the follower 79 does not interfere with rotation of the cam 38.

When the assembly 50, comprising, as shown in Figs. 4, 5, and 6, an end closure 83, a can 84, and an undesignated fuel slug positioned in the can, is to be welded, the assembly is positioned on the base member 55, with the closed end of the can 84 downward against the base member, and the open end of the can and the end closure upward in position to be engaged by the roller 49, which, as shown in Fig. 1, properly locates the upper end of the assembly 50 at the proper level for welding in spite of slight variation in the length of the assembly. The yieldably mounted base member 55 permits the handling of assemblies 50 of slightly different lengths without interfering with the roller in setting the level of the tops of the assemblies. Now clamp 56 is moved by the toggle linkage 57 against the assembly to clamp it against the silver contacts 48. Now the roller 49 is permitted to move to one side away from the assembly under the action of the spring 54. Pneumatic pressure against the piston in the cylinder 81 is reversed, retracting the follower 79 and thus permitting the cam 38 to rotate. Now the motor 28 is driven to rotate the assembly 50 and the cams 36, 37, and 38.

When the follower 66 starts down the side of pointed portion 72 of the cam 37, the arm 65, acting through its projection 69 and the follower 70, closes the micro-switch 71, thereby initiating an arc between the electrode 73 and the end closure 83 as the electrode 73 passes the center of the end of assembly 50. At this time the outward swinging of the arm 65 will have been effective through angular movement of the shaft 64 and the arm 78 to bring the electrode 73 to the center of the end closure 83. Thus the arc is started over the center of the end closure as shown in Fig. 4. The arc may be started at high frequency and thereafter maintained at a low frequency, produced by an appropriate change in phase and voltage relationship. Now as the cams 36, 37, and 38 continue to rotate in a direction that is viewed as counterclockwise in Fig. 2, the follower 66 moves off the pointed portion 72 to a long portion 85 of intermediate radius, which permits the arm 65, acting through the shaft 64 and the arm 78, to shift the electrode 73 to a region of the end closure 83 intermediate the center and the peripheral edge thereof. Now follows a complete rotation of the assembly 50 in which the arc is directed for preheating of the end closure 83 and the upper open end of the can 84 over regions of the end closure that mark a circular path inward of the peripheral edge, as shown in Fig. 5. This occurs through less than half a rotation of the cam 37, because the inner shaft 20, which rotates the assembly 50 being welded, makes about 2.4 rotations for each rotation of the outer shaft 18, which rotates the cam 37.

After passing over the cam portion 85, the follower 66 engages a somewhat longer portion 86 of the cam 37 which is of less radius than the cam portion 85. Thus the arm 65 is angularly shifted so as to act through the shaft 64 and the arm 78 to bring the electrode 73 to the outer edge of the end closure 83, and the open end of the can 84. Now follow about 1.3 rotations of the assembly 50 in which the welding arc is directed at the peripheral edge of the end closure 83 and the open end of the can 84, as shown in Fig. 6 and welds the end closure and the can to one another. Just before the first rotation of the above 1.3 rotations is completed, the welding current is caused to begin decaying so that for .3 rotation it performs a crater-filling operation upon the weld just produced between the end closure and the open end of the can. This may be done by separating the coils in the welding transformer, not shown, until the arc is extinguished after 0.3 rotation. This action is initiated by portions 87 and 88 of relatively small and relatively large radii on the cam 36 and a roller follower 89 of a micro-switch 90. This micro-switch may be used to admit fluid to a cylinder in which a piston moves to change the spacing of the transformer coils. When the cam portion 88 moves into engagement with the follower 89, the micro-switch 90 is actuated and carries out the crater-filling operation through decay of the welding current, as previously described.

If the end closure 83 and the can 84 being welded by the novel apparatus of the present invention are aluminum, it is necessary to maintain a suitable non-oxidizing atmosphere at the welding region. Argon may be used in such an atmosphere. No way is disclosed herein for supplying the present apparatus with a non-oxidizing atmosphere, since the use of this type of atmosphere with the present apparatus forms per se no part of the present invention.

The welding apparatus and method of the present invention are applicable to the bonding of parts composed of other materials than aluminum.

The intention is to limit the invention only within the scope of the appended claims.

What is claimed is:

1. A welding apparatus comprising means for rotating an object to be welded, a welding electrode, means for positioning the electrode at the center of the object to initiate an arc, means for moving the electrode to a region of the object between the center and the outer edge thereof and holding the electrode there for one rotation of the object for preheating the same, and means for moving the electrode to the edge of the object and holding the electrode there for one rotation of the object for welding the same.

2. Apparatus for welding an end closure to the open end of a can containing a fuel slug, and apparatus comprising means for rotating the assembled fuel slug, can, and end closure, a welding electrode, means for positioning the electrode at the center of the end closure, means for striking an arc between the end closure and the electrode while so positioned, means for moving the electrode to a region of the end closure between its center and its outer edge to enable preheating of the end closure and the open end of the can to take place during rotation of the assembled fuel slug, can, and end closure, and means for moving the electrode to the outer edge of the end closure to enable welding to take place between the open end of the can and the outer edge of the end closure.

3. The apparatus specified in claim 2, the means for rotating the assembled fuel slug, can, and end closure comprising a motor, an inner shaft, and means drivingly connecting one end of the motor with the inner shaft, the means for moving the welding electrode across the end closure comprising a cam, a follower engaging the same, an outer hollow shaft secured to the shaft and surrounding the inner shaft and means drivingly connecting the outer shaft with the other end of the motor, whereby the inner shaft and the assembled fuel, can, and end closure may make somewhat more than two rotations for each rotation of the cam and the outer shaft.

References Cited in the file of this patent

UNITED STATES PATENTS

| 847,746 | Edison | Mar. 19, 1907 |
| 1,542,753 | Wilstie | June 16, 1925 |
| 1,550,651 | Charter | Aug. 18, 1925 |
| 1,971,822 | Klein | Aug. 28, 1934 |
| 2,632,081 | Evans | Mar. 17, 1953 |
| 2,745,935 | Powley | May 15, 1956 |